United States Patent
Erlichman

[15] 3,702,580
[45] Nov. 14, 1972

[54] RECIPROCATING DRAWER TYPE PHOTOGRAPHIC APPARATUS AND METHOD

[72] Inventor: Irving Erlichman, Wayland, Mass.
[73] Assignee: Polaroid Corporation, Cambridge, Mass.
[22] Filed: Nov. 28, 1969
[21] Appl. No.: 880,794

Related U.S. Application Data

[63] Continuation-in-part of Ser. No. 878,638, Nov. 21, 1969, abandoned.

[52] U.S. Cl. ..............................95/13, 95/23, 95/30
[51] Int. Cl. ............................................G03b 17/50
[58] Field of Search............95/13, 19, 23, 24, 26, 30

[56] References Cited

UNITED STATES PATENTS

| | | | |
|---|---|---|---|
| 641,268 | 1/1900 | Chase | 95/30 |
| 3,447,437 | 6/1969 | Tiffany | 95/13 |
| 458,981 | 9/1891 | Perry | 95/19 |
| 3,350,990 | 11/1967 | Finelli et al. | 95/13 |

*Primary Examiner*—Samuel S. Matthews
*Assistant Examiner*—Richard L. Moses
*Attorney*—Brown and Mikulka and Robert E. Corb

[57] ABSTRACT

A camera and photographic method performed by the camera adapted to employ a film assemblage including a plurality of self-developing film units enclosed within a container having an exposure aperture in the forward wall thereof. A film unit is exposed within the container, moved, leading end foremost, from the container through one of a pair of slots at one end of the container and between a pair of pressure applying members for distributing a processing liquid within the film unit to form an image therein; and is then returned to the container through the other slot to a position behind the other film units in which the processed film units is oriented in substantially the same way as originally oriented prior to exposure. The camera includes a compact housing for enclosing the film container and pressure applying members and, following exposure, the film unit is moved in opposite directions outwardly from the film container and housing during distribution of the processing liquid by the pressure-applying members in the opposite direction and then past and to the rear of the pressure-applying members into the housing and film container wherein processing of the film unit, i.e., image formation, is continued toward completion. During exposure, subsequent movement during processing and then return movement into the film container, a film unit is maintained in a generally planar configuration. The camera includes an extensible enclosure for the film units during movement thereof; film engagement members within the enclosure for returning the film unit to the film container following completion of its outward motion; and a door at its opposite end which may be opened to remove a processed film assemblage from the film container through a withdrawal opening at the end thereof to permit viewing of a processed film unit. A film unit may be reintroduced into the film container through the withdrawal opening and the door includes a member for properly locating such a film unit within the container so that it does not interfere with introduction of succeeding units into the container.

54 Claims, 7 Drawing Figures

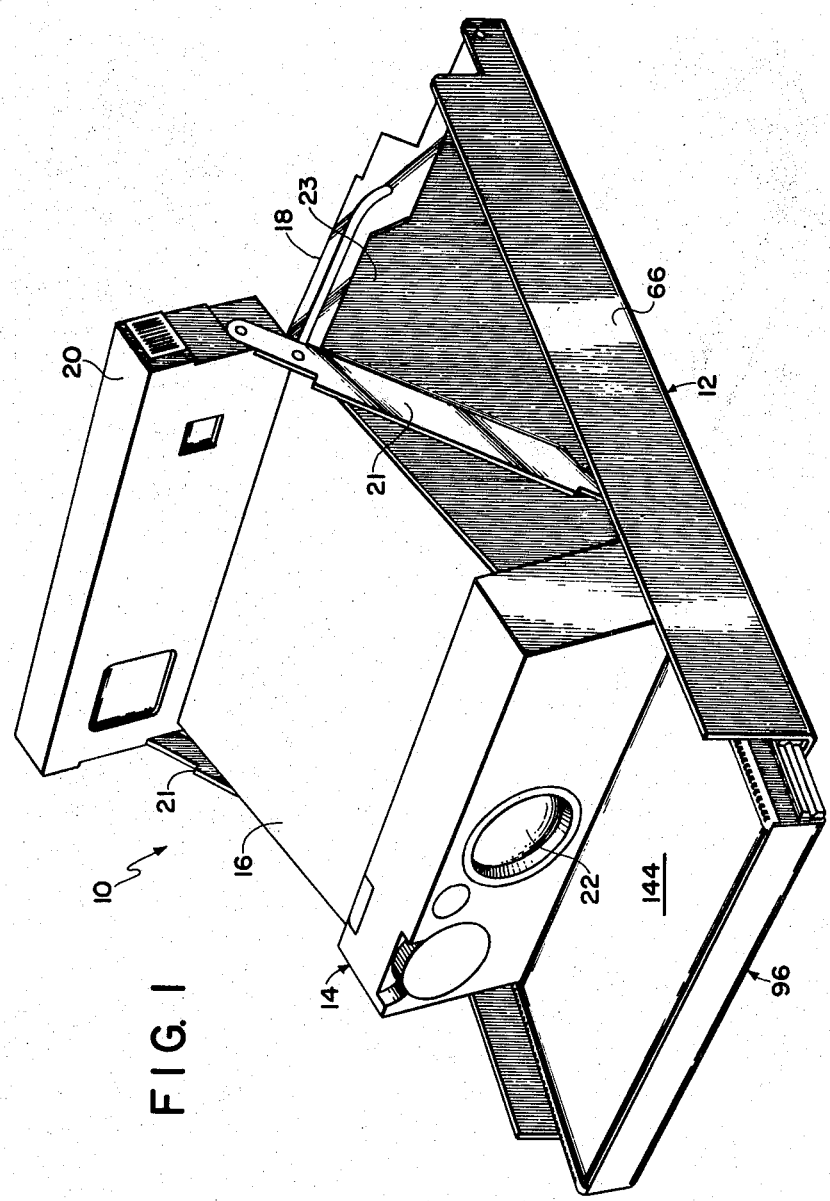

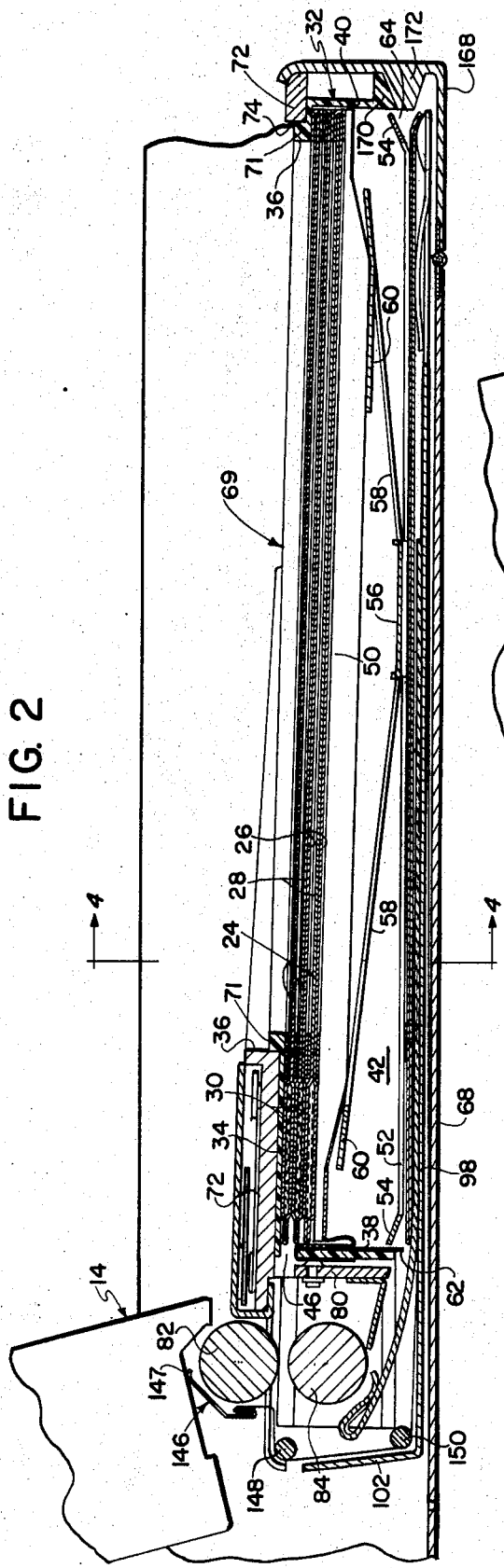
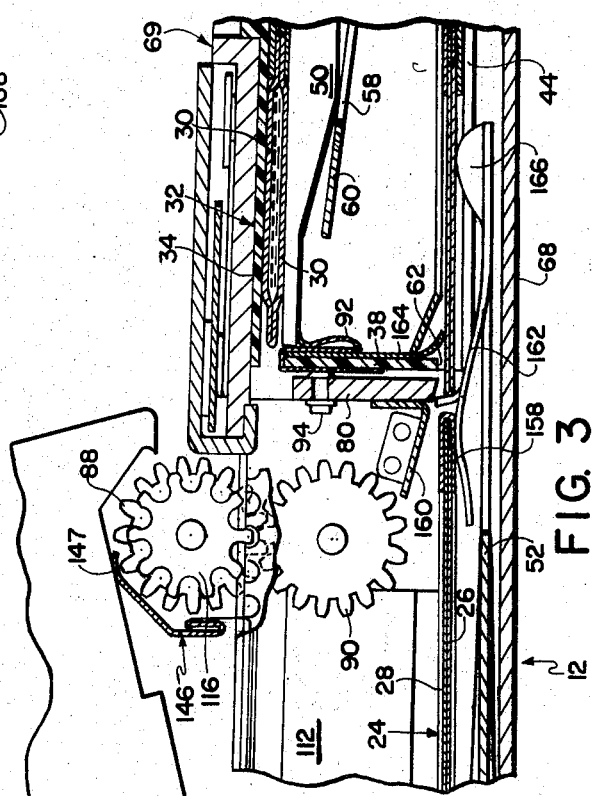
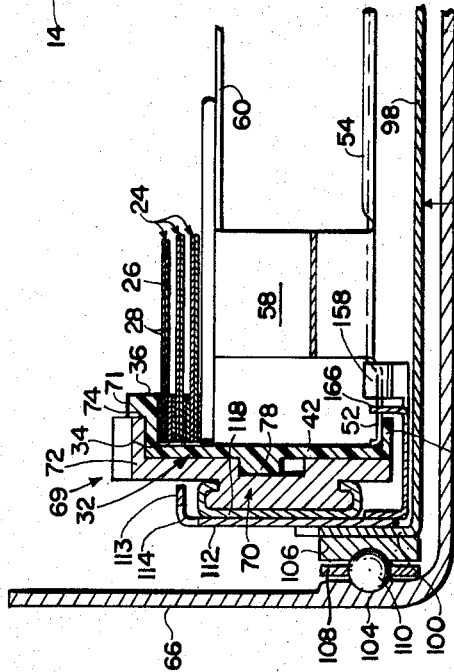

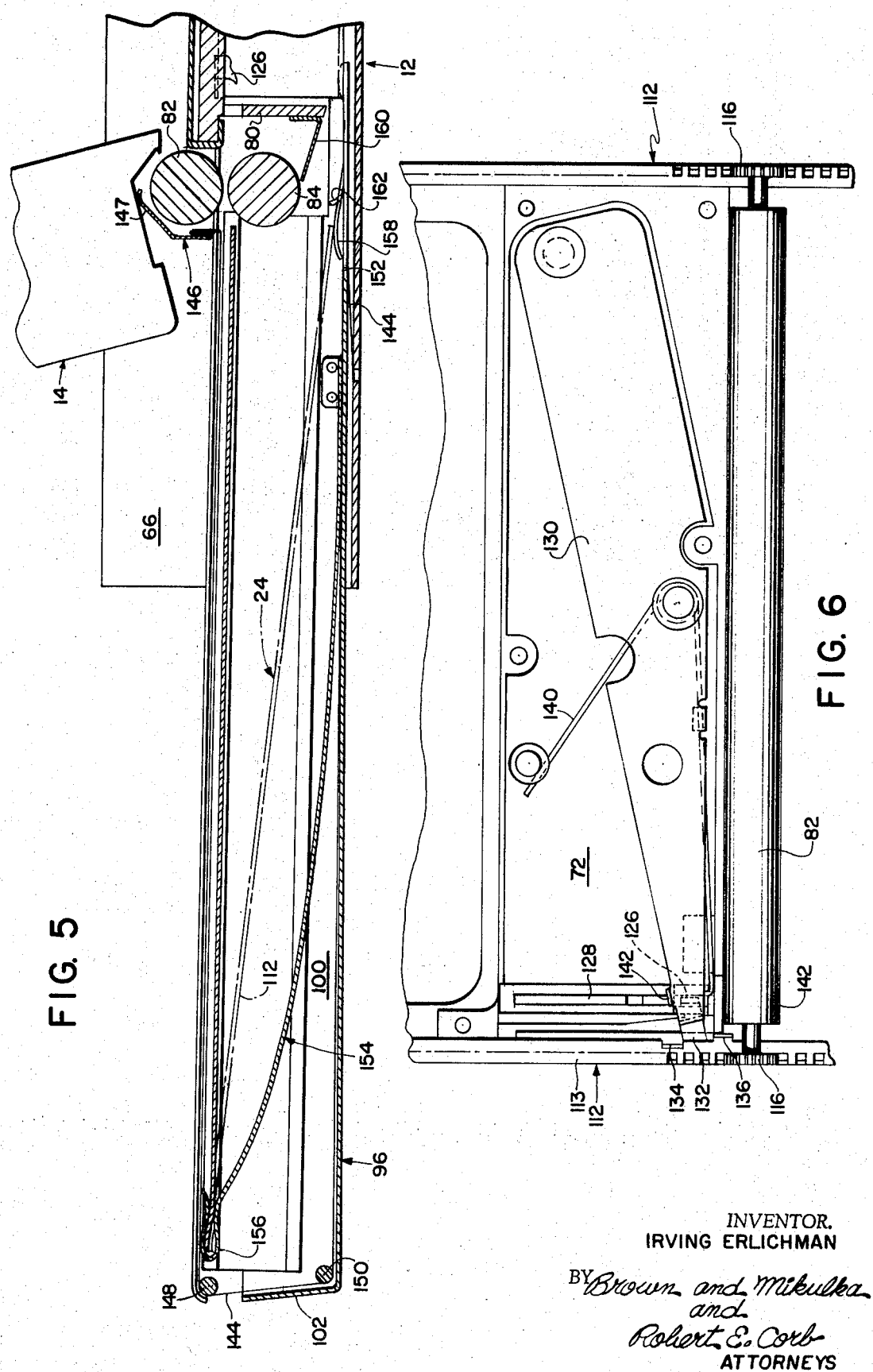

INVENTOR.
IRVING ERLICHMAN

BY Brown and Mikulka
and
Robert E. Corb
ATTORNEYS

RECIPROCATING DRAWER TYPE PHOTOGRAPHIC APPARATUS AND METHOD

This application is a continuation-in-part of my copending application, Ser. No. 878,638, filed Nov. 21, 1969, now abandoned.

The back of the camera of the instant invention includes a pair of pressure applying members for engaging an exposed film unit therebetween while advancing the film unit, distributing a liquid processing composition within the film unit to initiate formation of a visible image; and means for advancing each film unit from exposure position within the film container, leading end foremost, through a slot in one end of the container into engagement with the pressure applying members which are driven so as to continue advancing the film unit from the container while distributing the processing liquid therein. Extreme compactness is achieved by restricting the volume of the camera back as nearly as possible to the minimum necessary to house essential components including a film assemblage positioned for exposure, the means for feeding a film unit into engagement with the pressure applying members, the pressure applying members and other relatively compact means to be described hereinafter. The film assemblage and the film units contained therein are, in many respects, similar to or with those shown and described in the following U. S. patents and co-pending U. S. applications commonly assigned herewith: U. S. patents of Edwin H. Land, U. S. Pat. Nos. 3,415,644, 3,415,645 and 3,415,646 dated Dec. 10, 1968; U. S. Pat. applications of Edwin H. Land, Ser. No. 622,287, and Edwin H. Land et al., Ser. No. 622,286, both filed Mar. 10, 1967, the latter application now abandoned; Richard J. Chen, Ser. No. 723,040 filed Apr. 2, 1968 and now United States Pat. No. 3,552,292; and Nicholas Gold, Ser. No. 784,161 filed Dec. 16, 1968.

Film assemblages or packs of the foregoing type generally comprise a plurality of film units arranged in stacked relation and enclosed in a relatively thin, rectangular, light-opaque container which is at least semi-rigid and has an exposure opening in its forward wall through which the forwardmost film unit is exposed, a slot at one end through which the exposed film unit is withdrawn and means within the container for supporting the forwardmost film unit substantially in a plane in position for exposure. Each film unit generally comprises a pair of rectangular, sheet-like elements secured in face-to-face relation and including at least a layer of a photosensitive image-recording material in which an image can be formed by differential exposure to actinic light; and a rupturable container of a liquid processing composition secured to the elements near an edge thereof in position to discharge its contents between layers of the elements for distribution therebetween over an area coextensive with the exposed area of a layer of photosensitive material, for permeation into said layer to initiate formation of a visible image in the film unit. Although a number of different image-forming processes can be performed employing this basic film structure, a preferred form of film unit particularly adapted for use in the camera and process of the invention includes a layer for receiving and/or supporting a visible image formed by diffusion-transfer process and the film unit is designed to be retained intact with the elements secured in superposition following processing, the transfer image being viewed through one of the superposed elements. For further examples and details of film units of this type, reference may be had to the aforementioned U. S. patents and applications.

An important feature of the "back" of the camera in which the film is exposed and processed, is exceptionally small size relative to the size of the film assemblage or pack employed therein and the size of the image produced. The essential components of the camera back include a housing for enclosing a film assemblage in a light-free environment; means for locating a film unit — the forwardmost — in position for exposure; pressure applying means, preferably a pair of juxtaposed pressure applying rollers, for engaging and advancing a film unit therebetween to distribute a processing composition within the film unit; film feed means for advancing an exposed film unit from the container into engagement with the pressure applying members; and a means for driving and coordinating the operation of the pressure applying and film feed means. Relatively small size and compactness are obtained by employing a housing capable of containing little more than a film pack, film feeding and pressure applying means and having a volume only slightly in excess of the aggregate space occupied by the foregoing components. Another factor which is determinative of the camera size is the necessity for avoiding substantial bending or otherwise distorting each film unit during processing as this can have an adverse effect on the image formed in the film unit. In other words, it is desirable to maintain the substantially planar configuration of each film unit during processing as well as during exposure.

In view of the foregoing constraints, relatively small camera size can be most easily achieved by moving a film unit along a generally linear path from exposure position within the container, between the pressure-applying members and directly from between the pressure-applying members to the exterior of the camera. However, in many photographic image forming processes of the type performed by cameras of the foregoing type, each film unit remains, for some time following completion of the distribution of the processing composition within the film unit by the pressure applying means in a photosensitive condition, that is, a condition in which the photosensitive layer is subject to exposure to actinic environmental light detrimental to the visible image formed during processing. Although this time, during which the photosensitive material is subject to exposure may vary, depending upon construction and composition of the film unit and the image forming process, from a few seconds to a minute or more, the film units, during this time, must be maintained in a substantially light-free environment following commencement of processing, a requirement that is obviously inconsistent with moving the film unit outside of the camera directly from between the pressure applying members.

The application discloses a structure providing an answer to both of these problems, and this is a reciprocating device for engaging the film unit as it is advanced from the housing between the pressure applying members, supporting the film unit and returning the film unit in substantially the opposite direction into the housing from which it was advanced by the pressure applying members, and enclosure means for temporarily expanding the volume of the light-free environment to enclose the film units during movement thereof outwardly from the housing and then inwardly into the housing. This device for supporting, moving and enclosing the film unit while it is outside of the housing is especially designed to occupy a relatively small space within the housing and takes the form of a drawer having rear and side walls constructed and arranged to lie closely adjacent the rear and side walls of the container of a film pack contained within the housing and a thin flexible curtain adapted to cooperate with the drawer, when the drawer is extended, to form a relatively large volume, lighttight enclosure or a chamber for enclosing the film unit and the means for supporting and moving the film unit while it is outside of the camera housing. A curtain in combination with the drawer occupies a relatively small volume within the housing so that the increase in the dimensions of the housing resulting the necessity for providing space for the curtain and drawer is almost negligible.

As previously noted, however, the processed film unit is returned to the housing so that space must be provided within the housing to accommodate the film unit in a light-free environment. The amount of space required within the housing depends upon the number of film units which are to be contained. For example, if the camera is to expose and process film units one at a time with each film unit being removed from the housing when processing thereof is complete and prior to processing of the next succeeding film unit, then only a minimal space need be provided within the housing to accommodate the film unit for the period during which it is required to be maintained in a light-free environment. However, if the camera is to have the facility to expose and process a number of film units, e.g., eight or ten, in rapid succession such that, for example, the first film unit is required to remain in a light-free environment following commencement of processing of the last film unit, then provision must be made for the substantial space in a light-free environment required by the multiplicity of film units. Such a requirement could be satisfied by increasing the size (fixed) of the camera housing or camera back or by providing an expandable chamber thereby adding to the complexity and cost of the camera back.

The present invention provides a third and improved solution to the problem of providing space within a camera housing for containing, in a light-free environment, a film unit which has been withdrawn from the container for processing and then returned to the container.

Another object of the invention is to provide a substantially automatic photographic processing system including apparatus capable of processing a succession of photographic film units and returning them to the pack in which they were originally supplied so that the operator need only load a film pack into the apparatus, such as a camera, expose the film units and then remove from the apparatus the same film pack now containing a plurality of processed film units each containing a visible image and preferably constituting a completed positive photographic print on which no further operation need be performed.

A further object of the invention is to provide photographic apparatus and methods of the type described permitting an exposed and processed film unit to be withdrawn from a film pack container and apparatus, such as, a camera, for examination without subjecting other film units within the container to a damaging exposure by ambient light and to return the film unit to the container for storage following examination outside of the camera.

The invention accordingly comprises the apparatus possessing the construction, combination of elements and arrangement of parts, and the method involving the several steps and the relation and order of one or more of such steps with respect to each of the others, which are exemplified in the following detailed disclosure, and the scope of the application of which will be indicated in the claims.

For a fuller understanding of the nature and objects of the invention, reference should be had to the following detailed description taken in connection with the accompanying drawings wherein:

FIG. 1 is a perspective view of photographic apparatus in the form of a camera embodying the invention;

FIG. 2 is a fragmentary sectional view of a portion of the camera taken substantially midway between the sides of the camera;

FIG. 3 is an enlarged sectional view similar to FIG. 2;

FIG. 4 is a transverse sectional view taken substantially along the line of 4—4 of FIG. 2;

FIG. 5 is a sectional view similar to FIG. 2 illustrating the operation of the camera and the process performed thereby;

FIG. 6 is a plan view showing components of the camera;

Figure 7:
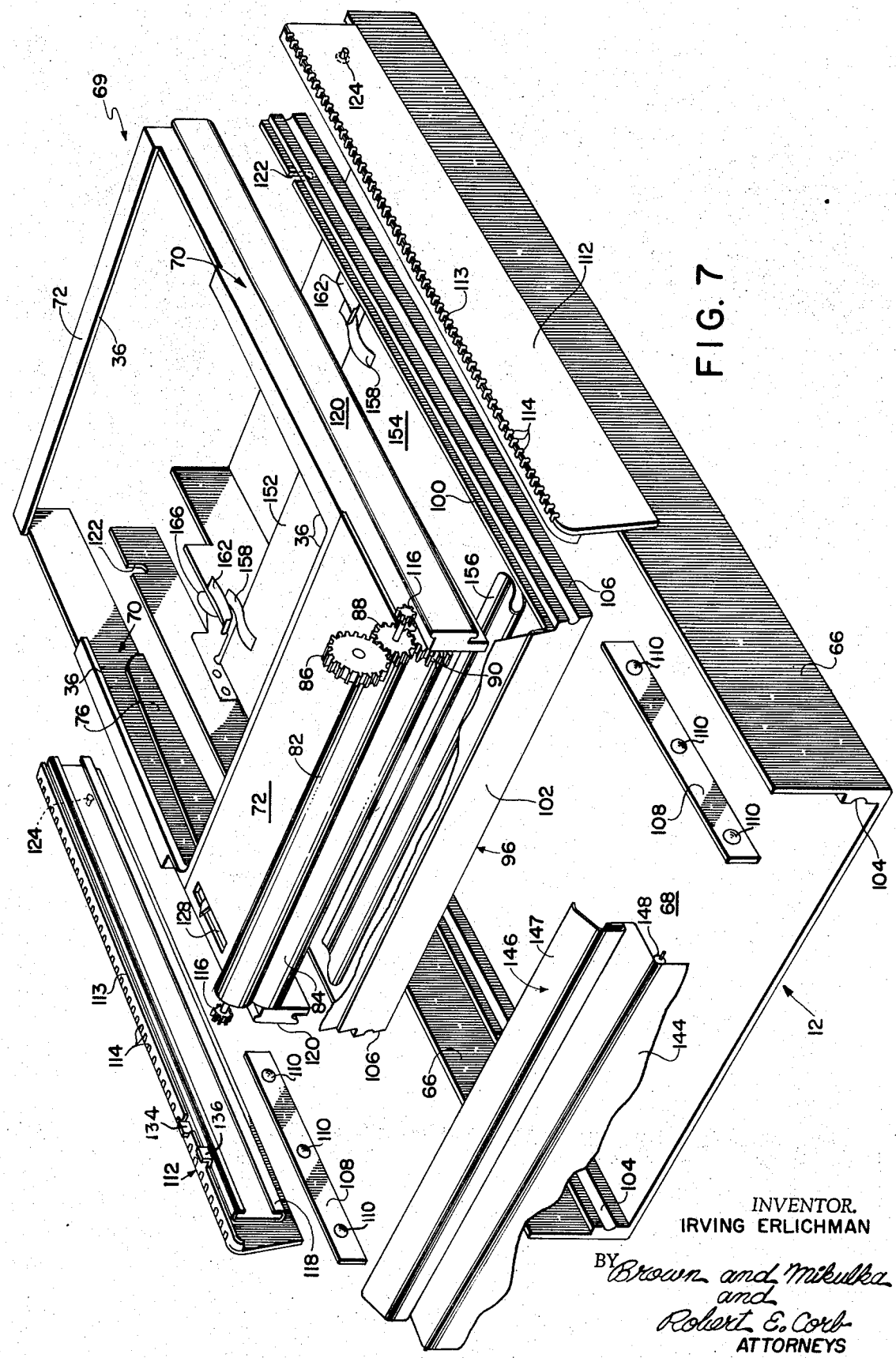
FIG. 7 is an exploded, perspective view showing components of the camera.

Reference is now made to FIG. 1 of the drawings wherein there is illustrated photographic apparatus in the form of a self-developing camera embodying the invention. It should be understood that the present invention is concerned with the components of the camera which hold the film in position for exposure and then process the film, and that structures embodying the invention may take other forms, such as film holders or camera backs, adapted for use with independent exposure systems that can be separated from the film holding and processing unit.

Camera 10 is shown in an erect or operative position and includes a rear housing section, generally designated 12, incorporating the structure of the invention and adapted to perform the method thereof. With the exception of drive means, such as a motor, the remaining components of the camera shown in FIG. 1 are involved in the exposure of a photosensitive element positioned in the rear section. These other components include a housing 14 for mounting and enclosing a lens and shutter assembly, preferably of an electrically operated type, a first cover panel 16 pivotally connected at one edge by a hinge to housing 14 and a second cover panel 18 pivotally coupled by a hinge at one edge to cover panel 16 and at its opposite edge to rear housing section 12; and a view finder and range finder combination designated 20 mounted on an erecting linkage 21. Camera 10 is of the folding type and is adapted to be folded from the erect or operative position (shown) to a folded position in which the camera takes the form of a relatively long, thin, parallelepipedon in which panels 16 and 18 provide one face of the camera, rear housing section 12 provides the sides and the rear face of the camera and the range finder-view finder 20 is seated in a recess in the end portion of cover panel 18 at which the cover panel is pivoted to the rear housing sections.

The optical components of the exposure system of the camera include a lens designated 22 and a mirror (not shown) mounted on the inside of the second panel 18 for directing light from lens 22 toward a photosensitive element positioned for exposure within rear housing section 12. A flexible bellows designated 23 is connected between housing 14, second cover panel 18 and rear housing section 12 and cooperates to form a light-free chamber through which light from lens 22 is transmitted by way of the mirror to a photosensitive element in the rear housing section.

Camera 10 is adapted to be employed with a film assemblage or film pack such as shown application and illustrated in FIGS. 2 through 4 of the drawings. This film pack comprises a plurality of film units 24 of the type shown and described in detail in the aforementioned Land patents. Each film unit 24 incorporates all of the materials necessary to produce a positive photographic print and includes a photosensitive element 26, a second or image-receiving element 28, which is transparent and secured in face-to-face relation with the photosensitive element, and a rupturable container 30 of processing liquid secured to one end of the photosensitive and second elements for dispensing its liquid contents therebetween in response to the application of compressive pressure to the container. Each film unit is adapted to be processed by advancing the film unit, container foremost, between a pair of pressure applying members which dispense the liquid contents of the container therefrom between the photosensitive and second elements and distribute the liquid between and in contact with the two elements toward the trailing ends thereof. Image-forming processes affected by film units of this type are well known in the art and involve the formation of transferable image-forming substances in the exposed photosensitive element and diffusion of the image-forming substances to another layer within the film unit, preferably carried by the second element, where the image-forming substances produce a visible, positive image. In a preferred example of such a film unit shown herein and discussed in the aforementioned Land patents, the processing liquid preferably includes a white opacifying agent which is spread between the photosensitive layer and an image-receiving layer on a transparent second element to form a layer which is preferably opaque to actinic light, provides a background for the positive transfer image and serves to mask any image formed in the photosensitive element.

The film pack comprises a plurality of film units 24 arranged in stacked relation in an opaque container or box 32, having a forward wall 34, formed with an exposure aperture 36 substantially co-extensive in size and shape with the image to be formed, a leading end wall 38, a trailing end wall 40, and side walls 42. Box 32 also includes either a full rear wall or as shown most clearly in FIG. 4, a partial rear wall in the form of flanges 44 formed integrally with the rear edge portions of side walls 42 and each extending toward the other part way across the rear of the container. Container 32 is provided with a first opening 46 (see FIG. 2) located in end wall 38 adjacent forward wall 34 dimensioned to permit the movement of film units 24, one at a time, from the container.

The function of the partial rear wall, or flanges 44, is to support means for supporting a stack of film units 24 with the forwardmost film unit located in position for exposure against forward wall 34 in alignment with first opening 46. In a preferred embodiment of the film assemblage shown, these means include a spring and pressure plate assembly which also functions to divide the container into a forward section, or chamber and a rear section, or chamber. The spring and pressure plate assembly includes a divider 50 having a relatively rigid structure adapted to fit between and in contact with the side and end walls for supporting a stack of film units; and a spring assembly for urging the divider 50 forwardly toward forward wall 34. The spring assembly is illustrated as being formed of a single, rectangular blank of a resilient sheet material, such as sheet metal, and includes two side rails 52 joined at their ends by transverse members 54 and intermediate there ends by a cross member 56. Pairs of cantilever springs 58 joined at their free ends by transverse members 60 extend from cross member 56 forwardly into engagement with divider 50 and are biased to urge the divider forwardly within the container.

The camera of the invention is designed to withdraw a film unit from box 32 through first opening 46, distribute a processing liquid within the film unit and then return the film unit to the box to a position behind the spring and pressure plate assembly between side rails 52 and flanges 44. The camera is also designed to permit a film unit that has been reintroduced into the pack, to be withdrawn from the pack at the end thereof opposite that from which the film unit was withdrawn and reintroduced. Accordingly, container 32 is provided with a second opening in the region of leading end wall 38 through which a film unit may be reintroduced and a third opening at the opposite end of the container through which a film unit may be withdrawn for examination and, in the preferred embodiment, reintroduced following examination outside of the camera. In the embodiment of the film unit shown, the second opening through which the film unit is introduced into the film pack box following processing is formed in the rear portion of leading end wall 38 adjacent flanges 44 (or the rear wall if the box is so constructed) and takes the form of a slot designated 62. The front to back dimensions of opening, or slot 62, is approximately equal to the maximum thickness of the film unit to permit introduction of one film unit at a time into the rear portion of the box. To facilitate introduction of the film unit, the ends of rails 52 are bent forwardly adjacent leading end wall 38.

A third opening designated 64 (see FIG. 2) is formed in trailing end wall 40 adjacent flanges 44 and preferably has a front to rear dimension substantially greater than the maximum thickness of a film unit in order to allow a film unit to be reintroduced into the film pack box forwardly of a film unit presently contained therein.

The rear section of the camera, best seen in FIGS. 2 through 4 and 7, includes means for locating the container 32 of a film pack within the camera with the forwardmost film unit positioned for exposure and means permitting loading of film pack into the camera, withdrawal of the film unit following exposure and processing of the film units and withdrawal of a film unit for examination. Rear housing section 12 comprises side walls 66 and a rear wall 68 which may be formed as one or more elements and are adapted to function both as a lighttight enclosure and as a support for operating components of the camera. The rear housing section of the camera also includes an inner frame 69 adapted to support operating components of the camera. In the form shown (see FIG. 7), inner frame 69 includes two side members 70 joined to one another by a forward wall 72 having an opening 74 for transmitting light to a film unit positioned for exposure and for locating a film pack box 32 in proper exposure position. For this purpose, forward wall 34 of film container 32 is provided with a lip 71 surrounding exposure aperture 36 and adapted to be engaged in opening 74 in forward wall 72.

To permit loading of a film pack into the camera, rear housing section 12 is mounted for pivotal movement from the closed or operative position shown in the drawings, to an open position in which the end portion of the rear housing section furthest from the leading end of the pack, is spaced rearwardly relative to inner frame 69. To support the pack in exposure position with the forward wall of container 32 located against the rear surface of forward wall 72 of inner frame 69, side members 70 of the inner frame are formed with inwardly projecting guides 76 adapted to engage flanges or rails 78 (see FIG. 4) on side walls 42 of the film pack container. To load a film pack into the camera, rear housing section 12 is pivoted rearwardly to increase the spacing between the components of the camera mounted on the rear housing section and forward wall 72 of the inner frame sufficiently to enable the passage of the leading end of the film pack container (which is thicker than the trailing end thereof) so that the container may be introduced leading end foremost. Rails 78 are engaged by guides 76 which cooperate with forward wall 72 to form tapered channels for displacing the film pack forwardly as it is moved into the camera. The inner frame 69 also includes a transverse member 80 (see FIG. 3) connecting side members 70 limiting movement of the film pack into the camera at a point at which the leading ends of rails 78 are engaged between forward wall 72 and guides 76, and lip 71 is engaged with the edge of opening 74 in forward wall 72. Detent means (not shown) engage the trailing end of film pack container to urge the latter forwardly to locate lip 71 within opening 74 and the forward wall of the pack against the rear surface of forward wall 72. Withdrawal of a film pack from the camera following exposure and processing of the film units is accomplished by pivoting the rear housing section to an open position and manually engaging end moving the trailing end of the film pack rearwardly until lip 71 is withdrawn from opening 74, at least at the trailing edge of the opening, sufficiently to permit the film pack to be slid towards its trailing end from engagement between guides 76 and forward wall 72. A suitable latch (not shown) is provided for retaining the rear housing section in the closed or operative position shown.

The camera includes processing means in the form of a pair of juxtaposed rollers 82 and 84 mounted on inner frame 68 with their axes located substantially in a common plane. Roller 82 is mounted in fixed position and roller 84 is mounted for movement with respect to roller 82 and is biased toward the latter by spring means (not shown). The camera includes means for rotating the rollers in juxtaposition to advance a film unit between the rollers while applying compressive pressure to the film unit to eject the fluid contents of container 30 between the photosensitive and image-receiving elements 26 and 28 of the film unit. Means (not shown) are provided for rotating the rollers and include a conventional electric motor enclosed within the lens and shutter housing 14 for driving a gear 86 meshed with a gear 88 mounted on roller 82 and meshed with a gear 90 mounted on roller 84. Housing section 14 including the electric motor and gear 86, is preferably pivotable about the axis of roller 82 so that gears 86 and 88 always remain in engagement, in both the folded and extended positions of the camera housing. Rear housing section 12 is also pivoted about the axis of roller 82 to permit loading of a film pack into the camera as previously described.

In the preferred form of the camera of the invention, not only are the processing rollers driven by an electrically energized motor, but the camera may include an exposure system comprising components such as shutter and aperture controls and illumination means such as a photoflash circuit, also adapted to be electrically energized. Although the source of power for the electrical components of the camera may comprise a battery provided as a component of the camera, a greater degree of compactness is obtained by providing a relatively thin battery, as a component of the film pack, the battery preferably being capable of supplying sufficient current to expose and process the film units contained in the film pack. In the form shown in FIGS. 2, 3, and 4 of the drawings, such a battery is shown as constituting divider 50 mounted within the film pack together with means for electrically coupling the battery to the electrically energized components of the camera when the film pack is loaded into the camera. These last mentioned means include a pair of flexible conductive strips 92, coupled to the electrodes of the battery and extended therefrom through first opening 46; and then rearwardly where conductive strips 92 are attached to the outer surface of leading end wall 38 of the film pack container. A pair of contacts 94 see FIG. 3 electrically coupled with the electrically energized components of the camera exposure and processing systems, are mounted on transverse member 80 for contacting conductive strips 92 when the film pack is loaded into the camera in position for exposure.

In the fully loaded condition of the film pack prior to exposure and processing of the foremost film unit, the battery is displaced rearwardly from the position shown in the drawings to a position at which the rear surface of the battery is in contact with cross member 56 and transverse members 54, springs 58 being displaced rearwardly so as to lie between rails 52. Thus in the fully loaded condition of the pack, there is little or no waste space and as film units are exposed and withdrawn from the forward section of the pack from in front of battery 50, the battery will move forwardly under the bias of spring 58 and a loop will be formed in flexible conductive strips 92.

As previously noted, following exposure, the forwardmost film unit 24 is moved through opening 46 until the leading edge of container 30 enters the bite of rollers 82 and 84 and is engaged thereby. The rollers are rotated to advance the film unit substantially in a plane in the same direction while ejecting the fluid contents of container 30 between the leading end portions of photosensitive element 26 and image-receiving element 28 and distributing the liquid therebetween. Rotation of the rolls is continued at least until the film unit has been advanced completely between and from engagement with the rolls, thereupon the film unit is moved in substantially the opposite direction while being guided such that the trailing end of the film unit passes behind roll 84 and enters the film pack through second opening 62. During this reciprocating movement of the film unit, provision must be made for maintaining the film unit in a light-free environment to prevent exposure of the photosensitive element by ambient light. The camera includes means for moving the film unit from exposure position into the bite of the processing rolls, for engaging the film unit after it has been advanced from between the processing rolls and then returning the film unit to the film pack container, and for enclosing the film unit in a light-free environment during movement of the film unit.

The means for performing the above mentioned functions are illustrated in FIGS. 2 through 7 as including a drawer 96 having a rear wall 98, dependent sides walls 100, and a leading end wall 102. Drawer 96 is mounted for reciprocating movement on and relative to rear housing section 12 with rear wall 98 of the drawer located closely adjacent rear wall 68 of the rear housing section and side walls 100 of the drawer located closely adjacent side walls 66 of the rear housing section. The means for mounting the drawer for reciprocating motion include ball bearing guides 106 on side walls 100 of the drawer. The ball bearing guides include grooves for engaging the balls, and retaining elements 108 having openings therein for receiving balls 110, are provided for preventing escape of the balls from the grooves in guides 106.

Drawer 96 is mounted for reciprocating motion between an initial position shown in FIG. 2 in which the drawer is located within the rear housing section with the rear wall 98 of the drawer located between the rear walls of the pack and camera housing and leading end wall 102 of the drawer located adjacent processing roller 84; and an extended position shown in FIG. 5 in which the drawer has been moved outwardly from the camera housing a distance approximately equal to the length of the film assemblage. The drawer, in the extended position, is adapted to receive and support an exposed film unit as the latter is advanced between processing rollers 82 and 84 and then be returned to its initial position to introduce the exposed and processed film unit into the film pack from which it had been advanced. The means for reciprocating the drawer include a pair of racks 112 each having a flange 113 formed with teeth 114 meshed with pinions 116 mounted on shafts extending from the ends of processing roller 82. Means are provided for mounting racks 112 for reciprocating motion in response to rotation of roller 82 in opposite directions and, in the form shown, these last mentioned means include a channel 118 having a C-shaped cross-section secured to each rack and engaged for sliding movement with a T-shaped track 120 on each side member 70 of inner frame 69. It will be apparent that drawer 96, although moved by racks 112, moves along a linear path diverging slightly from the linear path of movement of the racks so that the coupling between the drawer and racks is designed to permit relative motion of the drawer and racks. The means for coupling the drawer to the racks include slots 122 in side walls 100 of the drawer for engaging studs 124 on the racks. This form of coupling also permits relative motion between the drawer, which is mounted on the inner frame, and the racks which are mounted on the rear housing section when the latter is pivoted into an open position for loading of a film pack into the camera.

In the operation of the camera following an exposure, processing rolls 82 and 84 commence to rotate, in turn, driving the racks and drawer outwardly. Coincident with commencement of rotation of the rolls and motion of the drawer, the leading end of the exposed film unit, i.e., the forwardmost film unit, is moved from exposure position within the film pack through first opening 46 into the bite of the rotating rolls which engage and continue the motion of the film unit. The camera includes means for engaging the forwardmost film unit within the film pack and moving the film units through first opening 46. These means, best seen in FIGS. 6 and 7, include a film engagement member 126 mounted for reciprocating motion in the direction of movement of the film, on forward wall 72 adjacent one of side members 70 of the inner frame, and include a film engagement portion extending through a slot 128 in the forward wall and adapted to project through a slot in the forward wall 34 of the film pack container into an opening in the film unit near the leading end thereof, preferably in a lateral margin of container 30.

The camera includes means responsive to motion of racks 112 for moving film engagement member 126 in engagement with the forwardmost film unit from an initial position toward the processing rolls 82 and 84 to advance the forwardmost film unit into the bite of the processing rolls and for returning the film engagement member to its initial position in readiness to engage and advance the next succeeding film unit following exposure thereof. These means include an elongated lever 130 pivotally mounted at one end on the underside of forward wall 72 near the side of the forward wall opposite the film engagement member. Lever 130 extends across forward wall 72 and includes a free end section 132 extending in front of one of racks 112 into the path of movement of a pair of tabs 134 and 136 turned up from the flange 113 of the rack. Tab 134 is located furthest from the pivot of lever 130 and is adapted to engage end section 132 during initial movement of the rack to pivot lever 130 in a counterclockwise direction (viewing FIG. 6) toward the processing rolls. The end edge of section 132 moves along an arc such that tab 134 clears end section 132 after lever 130 has been pivoted through a predetermined angle designed to translate the film engagement member 126 in engagement with the forwardmost film unit sufficiently to advance the latter into engagement with the processing rollers. A spring 140 is provided for retaining lever 130 in the advanced position shown in FIG. 6. During return of the rack 112, tab 136, located closer to the pivotal axis of lever 130 than tab 134, engages end section 132 of the lever to return the lever to its initial position, i.e., pivot the lever in a clockwise direction. Thus during movement of the lever, end section 132 is captured between tabs 134 and 136. Lever 130 includes suitable means such as tabs 142 extending rearwardly into engagement with film engagement member 126 for reciprocating the film engagement member during pivotal motion of the lever.

The camera includes means cooperating with drawer 96 to form an expansible, lighttight enclosure for each film unit as the latter is advanced from between processing rollers 82 and 84. These last-mentioned means comprise a curtain 144 formed of a thin, flexible, light opaque material having a width approximating the spacing between racks 112. As best seen in FIG. 5, curtain 144 is attached at one end to a support member 146, extending from side to side of the rear section of the camera housing. Support member 146 includes a resilient edge portion 147 for engaging housing section 14 and forming a lighttight seal across the gap between the housing and processing roller 82. Curtain 144 extends from support member 146, around a first guide roller 148 mounted at its ends on the ends of racks 112 closely adjacent flanges 113; and thence around and behind a second guide roller 150 mounted at its ends within drawer 96 adjacent the inner section of rear wall 98 and end wall 102 of the drawer; and thence toward the trailing end of the drawer adjacent rear wall 98, around a transverse edge portion 152 of the rear wall 98 of the drawer; and thence between the wall 98 of the drawer and rear wall 68 of the rear housing section to a position behind the processing rollers where the curtain is secured to the rear wall of the rear camera housing. As the drawer is moved from the retracted or initial position shown in FIG. 2 to the extended position shown in FIG. 5, the lateral edges of the curtain are engaged between flanges 113 of racks 112 and channels 118 secured to the racks to form a lighttight engagement between the racks which move together with the drawer to the extended position. The edge portions of the curtain engaged with the racks cooperate with the racks and drawer to form a lighttight chamber or enclosure bounded by a forward wall provided by the curtain which also forms a portion of the end wall of the chamber. During reciprocating motion of the drawer between the retracted and extended positions thereof, the curtain may be maintained under a slight tension; however, the curtain is not required to stretch and is preferably inelastic.

As previously noted, movement of the drawer and rotation of the processing rolls commence at the same time so that the drawer is in motion toward its extended position while the forwardmost film movement is being moved into the bite of the processing rollers. The gearing arrangement between the processing rollers and racks which drive the drawer, are such that the film unit is moved between the rollers at a slightly faster rate than the drawer so that the film unit catches up to the drawer so that the leading end of the film unit is located closely adjacent the end of the drawer at about the same moment the trailing end of the film unit has been advanced from engagement with the processing rollers and the drawer reaches its fully extended position. At this point, the direction or rotation of gear 86 may be reversed to drive the processing rollers and drawer in the opposite direction to return the film unit to the rear housing section of the camera. Reversal of the direction of the rotation of gear 86 can be accomplished simply and easily by reversing the polarity of the current energizing the electric motor which drives the gear, and this in turn can be accomplished, for example, by conventional switches arranged for engagement by some part of the moving drawer or racks when the latter reach their fully extended positions.

Means are provided within the drawer for engaging the film unit in the fully extended position of the drawer, displacing the trailing edge portion of the film unit rearwardly and holding the leading edge of the film unit during return movement of the drawer into the rear housing section. These last mentioned means in the form of an elongated cantilever spring 154 mounted at one end near edge portion 152 of the drawer and extending forwardly and toward the leading end of the drawer and including an end section bent back upon itself to form a spring clip 156 for engaging the leading end of a film unit. The construction and arrangement of spring 154 and spring clip 156 are such as to locate the end section 156 in position to receive and engage the leading end of a film unit as the latter is advanced by the processing rollers at a faster rate than the drawer and upon engagement of the film unit between end section and disengagement of the trailing end of the film unit from the process rollers, to displace the trailing end of the film unit rearwardly.

As the drawer is retracted, spring clip 156 is displaced rearwardly so as to lie behind processing roller 84 in the retracted position of the drawer. As will be apparent from the FIGS. 2 and 5, during the reciprocating motion of the drawer and the film unit, the film unit retains its substantially planar configuration and is not subjected to any substantial bending stresses.

The camera includes means within the rear housing section for guiding the trailing end portion of a film unit into the film pack container through opening 62 as the drawer is retracted. These guide means are preferably designed to guide the trailing edge of the film units between rails 52 and flanges 44 and behind any film unit previously introduced into the rear section of the film pack container. The guide means include a rear spring guide 158 mounted on the drawer for supporting or urging the trailing edge of a film unit forwardly, so as to prevent the film unit from moving behind a film pack container when the drawer is retracted; and a forward guide plate 160 mounted on transverse member 80 and cooperating with rear spring guide 158 to form a convergent passage for directing the trailing edge of a film unit into second opening 62 of the film pack container.

Since spring clip 156 and the spring 154 of which it is composed, move to a position adjacent and behind processing roller 84, when the drawer is retracted, it will be apparent that the leading end of a film unit engaged by the spring clip will remain outside of the film pack container, and thus another operation is required to move the film unit completely into the container. Engagement means in the form of springs 162 are mounted on side walls 100 of the drawer adjacent the ends thereof for engaging the leading end of a film unit projecting from the container through second opening 62 during the initial portion of return movement of the drawer during the next succeeding processing cycle. Springs 162 engage the leading edge of the film unit to move the film unit completely into the film container where movement of the film unit is arrested. As the rear wall of the drawer continues to move behind the film container, springs 162 are deflected rearwardly out of engagement with the leading edge of the rearmost film unit.

Means are provided for retaining a film unit, introduced part way into the film pack container, against withdrawal from the container due to engagement of the film units with spring clip 156 as the drawer is moved to its extended position. These means may comprise a component of the film pack or of the camera and take the form of a resilient element extending rearwardly at least part way across second opening 62 and being deformable inwardly to permit movement of a film unit into the film pack through the second opening. This resilient member may be mounted on transverse member 80 of the inner frame or, as shown in FIGS. 2 and 3, may comprise a component of the film pack such as an element 164, formed of a thin, resilient, sheet material mounted on the inside of leading end wall 38 of the film pack container. It will be apparent from FIG. 3 that element 164 will be bent inwardly by engagement with a film unit during movement thereof into the container through second opening 62 and in the deformed position, will resist withdrawal of the film unit.

In the preferred mode of operation of the camera, a film unit is inserted into the film pack container through opening 62 between rails 52 and flanges 44 and to the rear of any film unit already engaged between the rails and flanges. The camera includes means for urging the rails and any film units located behind the rails, forwardly just ahead of the trailing edge of the film unit to provide a space into which the trailing end of the film unit may be introduced. These last-mentioned means may take the form of cams or wedges 166 mounted on the drawer in the region of engagement springs 162. Cams 166 may be mounted in substantially fixed position if the camera is designed to be employed with a film pack of the type shown including a container open at the back and having flanges 44. However, when the camera is designed for use with a film pack including a container having a rear wall, cams 166 are mounted on springs so that they can be deflected rearwardly by engagement with the rear wall.

As previously noted, the camera is designed to permit a processed film unit to be withdrawn from the film pack and camera for examination and for this purpose, the rear housing section is provided with a door 168 at the end thereof opposite the processing rollers. Door 168 is hinged to rear wall 68 and may be pivoted from the closed position shown in the drawings, to an open position to provide access to film units introduced into the rear section of the container. It may be desirable to return a film unit to the container following examination thereof inasmuch as the container provides a convenient place for storing the film units. This is accomplished by manually inserting the film unit, leading end first, through third opening 64 between flanges 44 and rails 52 and any film units contained within the rear section of the film pack container. A guide 170 may be provided on the trailing end wall 40 for facilitating the introduction of a film unit through third opening 64. It is possible for a film unit manually inserted into the rear section of the film pack container to interfere with the insertion of another film unit into the container through opening 62 if the manually inserted film unit is not properly located within the container. Means are provided for insuring proper location of a manually inserted film unit and in the form shown, include a film engagement member 172 mounted on door 168 and adapted to extend at least partially into third opening 64 for engaging and moving a film unit, projecting from the opening, into the pack when door 168 is pivoted into the closed position.

It will be appreciated from the foregoing description that the photographic apparatus of the invention provides unique advantages not heretofore found in self-developing cameras. In addition to the advantage of enabling the camera operator, if he wishes, to examine a photographic print within moments after making an exposure, the camera makes it unnecessary for the operator to handle the film between the time multiple exposure film pack is loaded into the camera and the time it is withdrawn following the exposure and processing of the film units initially contained in the film pack. A preferred form of such a camera will incorporate an automatic exposure system requiring only that the operator aim the camera and depress a button to initiate an exposure and processing cycle during which the exposure system is reset in preparation for making another exposure. Thus, for the first time, a self-developing camera is provided which need only be loaded, aimed at the subject, triggered to expose and process a succession of film units and then unloaded. Successive exposures can be made at a frequency limited only by the time required, e.g., a fraction of a second, to perform a processing operation on each film unit. In addition to the foregoing, there is the further significant advantage of a high degree of compactness achieved by storing film units, during image formation, in a space within the film pack container within the camera that otherwise would be wasted if the film units were stored within a light-free environment within the camera but outside of the film pack container.

Since certain changes may be made in the above apparatus and method without departing from the scope of the invention herein involved, it is intended that all matter contained in the above description or shown in the accompanying drawings shall be interpreted as illustrative and not in a limiting sense.

What is claimed is:

1. Photographic apparatus for use with a film assemblage comprising a container and at least a film unit including a sheet-like photosensitive element enclosed within said container, said apparatus comprising, in combination:

means for supporting the container of a film assemblage with the photosensitive element of a film unit therein, supported in the forward portion of the container in position for exposure;

processing means for engaging and moving a film unit in a first direction while distributing a processing composition in contact with the photosensitive element of said film unit;

means for moving a film unit from the exposure position thereof substantially in said first direction from a container into engagement with said processing means, the latter being adapted to continue the movement of said film unit in said first direction until said first unit is disengaged from said processing means;

transport means for engaging a film unit and upon disengagement thereof from said processing means, automatically moving said film unit to a position out of alignment with said processing means prior to said transport means moving said film unit in a second direction generally opposite to said first direction, to the rear of and past said processing means, into said container from which said film unit was withdrawn to a storage position located rearwardly of said exposure position; and guide means for guiding said film unit rearwardly of said exposure position into said container during movement of said film unit in said second direction.

2. Photographic apparatus as defined in claim 1 wherein said transport means are mounted for reciprocating movement substantially in said first and second directions.

3. Photographic apparatus as defined in claim 2 wherein said transport means include first engagement means for engaging the leading end of a film unit during movement thereof in said first direction and being movable in said first direction and being movable in said second direction in engagement with said film unit to introduce said film unit at least part way into the container from which it was withdrawn.

4. Photographic apparatus as defined in claim 3 further including means for moving said first film engagement means in said first direction from an initial position adjacent said processing means to a second position remote from said processing means during movement of a film unit in said first direction and then returning said first film engagement means in said second direction to said initial position thereof.

5. Photographic apparatus as defined in claim 4 further including means providing a light-tight enclosure for said means for supporting a container with a film assemblage located in position for exposure and for said processing means, said first film engagement means being located within said enclosure in said initial position and being located outside of said enclosure in said second position.

6. Photographic apparatus as defined in claim 5 wherein said enclosure has a normally fixed volume and further including means for temporarily expanding said volume of said enclosure during movement of said film unit in said first and second directions to maintain said film unit in a light-free environment.

7. Photographic apparatus for use with a film assemblage comprising a container and at least a film unit including a sheet-like photosensitive element enclosed within said container, said apparatus comprising, in combination:

means for supporting the container of a film assemblage with the photosensitive element of a film unit therein, supported in the forward portion of the container in position for exposure;

processing means for engaging and moving a film unit in a first direction while distributing a processing composition in contact with the photosensitive element of said film unit;

means for moving a film unit from the exposure position thereof substantially in said first direction from a container into engagement with said processing means, the latter being adapted to continue the movement of said film unit in said first direction until said film unit is disengaged from said processing means;

transport means for engaging a film unit and, upon disengagement thereof from said processing means, moving said film unit in a second direction generally opposite to said first direction, to the rear of and past said processing means, into said container from which said film unit was withdrawn to a storage position located rearwardly of said exposure position, said transport means being mounted for reciprocating movement substantially in said first and second directions, and said transport means include first engagement means for engaging the leading end of a film unit during movement thereof in said first direction and being movable in said first direction and being movable in said second direction in engagement with said film unit to introduce said film unit at least part way into the container from which it was withdrawn and second film engagement means for engaging the leading end of a film unit partially introduced into the container from which it was withdrawn and moving said film unit in said second direction further into said container; and guide means for guiding said film unit rearwardly of said exposure position into said container during movement of said film unit in said second direction.

8. Photographic apparatus as defined in claim 7 wherein said transport means are movable from an initial position in which said first film engagement means are located adjacent said processing means and said second film engagement means are located behind the container of a film assemblage supported in position for exposure, to a second position in which said first film engagement means are displaced in said first direction from said initial position and said second film engagement means are located adjacent said processing means.

9. Photographic apparatus as defined in claim 2 wherein said transport means include means for engaging a component of a film assemblage during movement of said transport means in said second direction to displace said component away from the path of movement of a film unit to permit introduction of said film unit into the container of the film assemblage.

10. Photographic apparatus for use with a film assemblage comprising a container and at least a film unit including a sheet-like photosensitive element enclosed within said container, said apparatus comprising, in combination:

means for supporting the container of a film assemblage with the photosensitive element of a film unit therein, supported in the forward portion of the container in position for exposure;

processing means for engaging and moving a film unit in a first direction while distributing a processing composition in contact with the photosensitive element of said film unit;

means for moving a film unit from the exposure position thereof substantially in said first direction from a container into engagement with said processing means, the latter being adapted to continue the movement of said film unit in said first direction until said film unit is disengaged from said processing means;

transport means for engaging a film unit and, upon disengagement thereof from said processing means, moving said film unit in a second direction generally opposite to said first direction, to the rear of and past said processing means, into said container from which said film unit was withdrawn to a storage position located rearwardly of said exposure position, said transport means being mounted for reciprocating movement substantially in said first and second directions, said transport means include means for engaging a component of a film assemblage during movement of said transport means in said second direction to displace said component away from the path of movement of a film unit to permit introduction of said film unit into the container of the film assemblage, the last-mentioned means including camming means for engaging a component of a film assemblage biased rearwardly within the container thereof and displacing said component forwardly against the bias thereon to facilitate movement of a film unit into the container of said film assemblage behind said component; and guide means for guiding said film unit rearwardly of said exposure position into said container during movement of said film unit in said second direction.

11. Photographic apparatus as defined in claim 7 wherein said first and second film engagement means are spaced from one another by a distance less than the length of travel of said transport means in said first direction.

12. Photographic apparatus as defined in claim 11 wherein said transport means are movable in said first direction from an initial position in which said first film engagement means are located adjacent said processing means.

13. Photographic apparatus as defined in claim 12 further including means providing a light-tight enclosure for said means for supporting the container of a film assemblage located in position for exposure and for said processing means, and wherein said first film engagement means are located within said enclosure in said initial position of said transport means.

14. Photographic apparatus as defined in claim 12 wherein said transport means include means for engaging a component of a film assemblage during movement of said transport means in said second direction to displace said component away from the path of movement of a film unit to permit introduction of said film unit into the container of said film assemblage.

15. Photographic apparatus as defined in claim 13 wherein said enclosure means include a drawer having rear and side walls located within said housing adjacent the rear and sides, respectfully, of the container of a film assemblage supported in said housing, and a curtain cooperating with said drawer during extension thereof to form said light-free enclosure for a film unit during movement thereof.

16. Photographic apparatus as defined in claim 13 wherein said first film engagement means are mounted on said drawer near an end thereof.

17. Photographic apparatus as defined in claim 16 wherein said second film engagement means are mounted on said drawer near the opposite end thereof.

18. Photographic apparatus as defined in claim 1 further including means providing a light-tight enclosure for said means for supporting the container of a film assemblage located in position for exposure and a movable closure member providing access to said enclosure near the end thereof opposite said processing means to enable removal of a processed film unit in said second direction from the container into which said film unit was introduced.

19. A photographic apparatus as defined in claim 18 including means associated with said closure member and movable thereby in said first direction into engagement with a film unit introduced in said first direction into said container to locate said film unit within said container in position to allow the introduction, in said second direction, of another film unit into said container.

20. Photographic apparatus as defined in claim 2 further including enclosure means providing a light-tight enclosure for said means for supporting a container of a film assemblage in position for exposure and for said processing means and wherein at least a portion of said transport means move from and into said enclosure during movement, respectively, in said first and second directions.

21. Photographic apparatus as defined in claim 20 wherein said enclosure means include a drawer having rear and side walls located within said housing adjacent the rear and sides, respectively, of the container of a film assemblage supported in said housing and a curtain cooperating with said drawer during extension thereof to form an expandable and collapsible light-free enclosure for a film unit during movement thereof.

22. Photographic apparatus as defined in claim 21 wherein said transport means include first engagement means mounted on said drawer for engaging the leading end of a film unit during movement thereof in said first direction and being movable, together with said drawer, in said second direction in engagement with said film unit to introduce said film unit at least part way into the container from which it was withdrawn.

23. Photographic apparatus as defined in claim 22 wherein said transport means further include second film engagement means for engaging the leading end of a film unit partially introduced into said container and moving said film unit in said second direction further into said container into said storage position.

24. Photographic apparatus as defined in claim 23 wherein said first and second film engagement means are spaced from one another by a distance less than the length of travel of said drawer in said first direction.

25. In photographic apparatus for use with a film assemblage including a film unit supported in exposure position substantially in a plane within the forward portion of a container, including processing means for engaging a film unit outside the container and distributing a processing composition within the film unit and a housing having substantially fixed dimensions providing an enclosure having a volume exceeding, by a relatively small amount, the aggregate volume of a film assemblage and said processing means, the improvement comprising a transport system for removing a film unit from exposure position within a container to effect the processing of the film unit and then returning the film unit to said container to a position therein behind the exposure position of the film unit while substantially maintaining the planar configuration of the film unit, said transport system comprising, in combination:

enclosure means occupying a relatively small proportion of the volume of said housing;

said enclosure means being extensible from an initial position at least partially within said housing, in the direction of movement of a film unit during distribution of a processing composition therein by said processing means, said enclosure means including means for supporting the film unit substantially in a plane and, during extension, providing a light-free enclosure for the film unit;

said processing means being adapted to engage and move a film unit in the aforementioned direction until said film unit is disengaged from said processing means;

first film engagement means mounted on said enclosure means for engaging the leading end of a film unit during movement thereof in said direction while in engagement with said processing means and automatically displacing the trialing end of the film unit rearwardly upon disengagement thereof from said processing means;

means for retracting said enclosure means and said film engagement means into said housing in a second direction substantially opposite to the said direction to move a film unit in said second direction to the rear of and past said processing means; and means for guiding the trailing end of a film unit into the container of a film assemblage during movement of the said film unit in said second direction past said processing means.

26. Photographic apparatus as defined in claim 25 wherein said enclosure means include a drawer having rear and side walls located within said housing adjacent the rear and sides, respectfully, of the container of a film assemblage supported in said housing and a curtain cooperating with said drawer during extension thereof to form said light-free enclosure for a film unit during movement thereof.

27. Photographic apparatus as defined in claim 26 wherein said first film engagement means are mounted on said drawer near the end thereof located adjacent said processing means in said initial position of said enclosure means.

28. Photographic apparatus as defined in claim 27 further including second film engagement means mounted on said drawer at a position spaced from said first film engagement means for engaging the leading end of a film unit extending from the container of a film assemblage and moving said film unit in said second direction completely into said container.

29. Photographic apparatus as defined in claim 28 wherein said first and second film engagement means are spaced from one another by a distance less than the length of travel of said drawer in said first-mentioned direction.

30. Photographic apparatus as defined in claim 26 wherein said drawer includes means for engaging a component of a film assemblage during movement of said drawer in said second direction to displace said component away from the path of movement of a film unit in said second direction to permit introduction of said film unit into the container of said film assemblage.

31. In photographic apparatus for use with a film assemblage including a film unit supported in exposure position substantially in a plane within the forward portion of a container, including processing means for engaging a film unit outside the container and distributing a processing composition within the film unit and a housing having substantially fixed dimensions providing an enclosure having a volume exceeding, by a relatively small amount, the aggregate volume of a film assemblage and said processing means, the improvement comprising a transport system for removing a film unit from exposure position within a container to effect the processing of the film unit and then returning the film unit to said container to a position therein behind the exposure position of the film unit while substantially maintaining the planar configuration of the film unit, said transport system comprising, in combination:

enclosure means occupying a relatively small proportion of the volume of said housing;

said enclosure means being extensible from an initial position at least partially within said housing, in the direction of movement of a film unit during distribution of a processing composition therein by said processing means, said enclosure means including means for supporting the film unit substantially in a plane and, during extension, providing a light-free enclosure for the film unit;

said processing means being adapted to engage and move a film unit in the aforementioned direction until said film unit is disengaged from said processing means;

first film engagement means mounted on said enclosure means for engaging the leading end of a film unit during movement thereof in said direction while in engagement with said processing means and displacing the trailing end of the film unit rearwardly upon disengagement thereof from said processing means;

means for retracting said enclosure means and said film engagement means into said housing in a second direction substantially opposite to the said direction to move a film unit in said second direction to the rear of and past said processing means;

means for guiding the trailing end of a film unit into the container of a film assemblage during movement of the said film unit in said second direction past said processing means; and said enclosure means further includes a drawer having rear and side walls located within said housing adjacent the rear and sides, respectively, of the container of a film assemblage supported in said housing and a curtain cooperating with said drawer during extension thereof to form said light-free enclosure for a film unit during movement thereof, said drawer further including camming means for engaging and displacing a component of a film assemblage against the bias of resilient means away from the path of movement of a film unit in said second direction to permit introduction of said film unit into the container of said film assemblage.

32. Photographic apparatus as defined in claim 25 wherein said housing is formed with an opening therein near the end of said housing furthest from said processing means to permit removal of a processed film unit from the container of a film assemblage supported within said housing.

33. Photographic apparatus as defined in claim 32 further including closure means for said opening, said closure means being movable between open and closed positions and including means for engaging a processed film unit within a container of said film assemblage at the end thereof farthest from said processing means and predeterminedly locating said film unit within said container in response to closure movement of said closure means.

34. A photographic method utilizing a film assemblage including a container and at least a photosensitive element located within a forward portion of said container, said method comprising the steps of:
locating a photosensitive element within the container of a film assemblage in position for exposure;
exposing said photosensitive element to form an image in said element;
withdrawing said exposed photosensitive element, leading end foremost, in a first direction completely from said container through an opening therein at one end thereof;
during withdrawal movement of said exposed photosensitive element, distributing a processing composition in contact with said exposed photosensitive element to initiate formation of a visible image in at least a layer associated with said photosensitive element, distribution of said processing composition being effected by moving said photosensitive element in a first direction in engagement with processing means until said photosensitive element is disengaged from said processing means;
arresting movement of said exposed photosensitive element in said first direction at an intermediate position following disengagement of said photosensitive element from said processing means and initiation of visible image formation;
automatically locating said film unit in position to be moved in a second direction back into said container; and
moving said photosensitive element in a second direction substantially opposite to said first direction at least partially into said container through an opening therein at said one end thereof to a position to the rear of said exposure position and any photosensitive element not previously withdrawn from said container.

35. A photographic method as defined in claim 34 wherein said photosensitive element is withdrawn through a first opening near the front of said container and is inserted into said container through a second opening near the rear of said container.

36. A photographic method as defined in claim 34 including the steps of arresting the movement of said photosensitive element in said second direction when said photosensitive element is only partially within said container and then recommencing and continuing the movement of said photosensitive element in said second direction at least until said photosensitive element is completely within said container.

37. A photographic method as defined in claim 36 wherein movement of said photosensitive element in said second direction from said intermediate position to a position at least partially within said container is effected by engaging said photosensitive element at the leading end thereof and pushing said photosensitive element into said container.

38. A photographic method as defined in claim 37 wherein movement of said photosensitive element completely into said container is effected by engaging said photosensitive element at the leading end thereof.

39. A photographic method as defined in claim 38 wherein said photosensitive element is engaged and moved completely into said container while a succeeding photosensitive element is being moved in said second direction.

40. A photographic method as defined in claim 37 wherein movement of said photosensitive element completely into said container is effected by engaging said photosensitive element at the opposite end thereof and drawing it in said second direction at least completely into said container.

41. A photographic method as defined in claim 40 wherein said photosensitive element is engaged manually at said other end thereof.

42. A photographic method as defined in claim 40 wherein said photosensitive element is drawn from said container through an opening in the end of said container opposite the first-mentioned opening.

43. A photographic process as defined in claim 34 wherein another photosensitive element is exposed and withdrawn from said container and treated with processing composition subsequent to exposure and processing the first-mentioned photosensitive element and then is introduced into said container into a position rearwardly of any photosensitive element previously introduced into said container and contained therein.

44. A photographic process as defined in claim 34 wherein another photosensitive element is exposed, withdrawn from said container and treated with processing composition subsequent to exposure and processing of the first-mentioned photosensitive element, and is then introduced into said container into a position forwardly of any photosensitive element previously introduced into said container.

45. A photographic process as defined in claim 34 wherein a processed photosensitive element is withdrawn in said second direction from said container through an opening in the opposite end thereof.

46. A photographic process as defined in claim 45 wherein the last-mentioned photosensitive element is subsequently reintroduced into said container by movement in said first direction through the last-mentioned opening.

47. The method of producing a plurality of visible photographic images utilizing a film assemblage including a container and a plurality of film units located within a forward portion of said container, each of said film units including at least a photosensitive image-recording layer, said method comprising the steps of:
- exposing the photosensitive image-recording layer of a film unit of a film assemblage to actinic radiation to form an image in said layer;
- while maintaining at least an end portion of said film assemblage in an enclosure free of actinic radiation, withdrawing the exposed film unit entirely from the container of said film assemblage at said end thereof and distributing a processing composition within said film unit to initiate formation of a visible image in said film unit;
- automatically moving said film unit to a position wherein it may be moved into said container;
- thereafter introducing said film unit into said container at said end while moving said film unit in a direction substantially opposite to the direction of withdrawal, to a position behind any film unit not previously withdrawn from said container for processing; and
- during withdrawal, processing and introduction of said film unit, temporarily expanding and reducing the volume of said enclosure as required to accommodate said film unit outside of said container.

48. A photographic method as defined in claim 47 wherein a film unit is introduced completely into said container in two steps, said film unit being moved part way into said container during said first step and being moved completely into said container during introductory movement of a succeeding film unit.

49. A photographic method as defined in claim 47 wherein a processed film unit is withdrawn from said container at the opposite end of said film assemblage.

50. A photographic method as defined in claim 49 wherein said processed film unit withdrawn from said container at said opposite end is reintroduced into said container behind any film units not previously withdrawn from said container for processing.

51. A photographic method as defined in claim 50 wherein said processed film unit withdrawn from said container is reintroduced into said container forwardly of all processed film units within said container.

52. A photographic method as defined in claim 51 wherein said film unit is introduced into said container in said second direction to the rear of all processed film units within said container.

53. A photographic method as defined in claim 47 wherein each succedding film unit is introduced in said second direction into said container forwardly of the preceding film unit.

54. A photographic method as defined in claim 47 wherein each succeeding film units is introduced in said second direction into said container rearwardly of the preceding film unit.

* * * * *